INVENTORS
LOUIS CITAREL
JOSEPH J. GIORDANO
BY
Donald H. Feldman
Agent

Oct. 24, 1967   L. CITAREL ET AL   3,348,351
SEALED STRUCTURES AND PROCESS THEREFOR
Filed Aug. 3, 1965   4 Sheets-Sheet 3

INVENTORS
LOUIS CITAREL
JOSEPH J. GIORDANO
BY
Donald H. Feldman
Agent

United States Patent Office 3,348,351
Patented Oct. 24, 1967

3,348,351
SEALED STRUCTURES AND PROCESS THEREFOR
Louis Citarel, Trenton, and Joseph J. Giordano, Woodbridge, N.J., assignors to Thiokol Chemical Corporation, Bristol, Pa., a corporation of Delaware
Filed Aug. 3, 1965, Ser. No. 476,987
17 Claims. (Cl. 52—393)

ABSTRACT OF THE DISCLOSURE

Enclosed structures are protected from penetration of water vapor by sealing with compositions based on curable, blocked or unblocked high rank liquid polysulfide polymers having —SSH terminals and a sulfur rank of about 1.6 to 5.

Sealed insulated structures have found extensive use as thermal and humidity barriers in the form of doors, windows, enclosures, cabinets, walls, and sealed constant temperature and/or humidity rooms and boxes. Such structures have thus been used to advantage in both cold and in hot climates, as desirable enclosures for air conditioned areas, and also in place of so called "storm" doors and windows. Commonly, the sealed structures are formed by sealing two or more enclosing elements together so as to form a sealed enclosed structure, the enclosing elements being separated to form a space or void usually a vacuum or containing some gas trapped within such as air. Certain performance requisites are prescribed by the specific end uses to which these sealed structures may be put, such as, with double glazed windows, a substantial resistance to penetration of moisture to avoid internal fogging. This resistance to vapor permeation is of prime importance when the enclosing elements are of a translucent nature. Fogging is caused by the formation of droplets of some liquid, most usually water, on the interior surfaces of the structure and within the void, thus to detract from the translucent properties of the structure. When the structure is first prepared, the enclosed void usually contains very little moisture. Numerous methods known to the art are used to assure this, such as by evacuation and/or by filling the void with a moisture-free gas, and/or through the inclusion of small quantities of a dessicant within the void. With time, however, and as external temperature, pressure and humidity fluctuate, gases, such as water vapor, exterior to the structure may pass by diffusion through the seal and into the void. Thus, as the amount of water vapor within the void is increased with time by more and more moisture passing from outside the structure through the seal and into the void, the dew point of the gas within the void will increase to cause fogging at higher and yet higher temperatures.

Thus an object of the present invention is to provide an improved sealed enclosed structure which markedly resists the permeation of moisture into its void space, resists the progressive increase in dew point temperatures of gases within such voids with time, and resists the internal fogging of the sealed structure at progressively higher and higher temperatures with time.

It is another object of the present invention to provide an improved sealed insulated structure which is sealed with a sealing means that is a cured polysulfide rubber seal which inherently has a reduced water-vapor permeability substantially below that of cured polysulfide rubber seals heretofore known.

Other desirable objects of this invention will become evident from, or are inherent in the following explanations and examples when taken in connection with the accompanying drawings.

In the drawings, wherein like numerals designate like parts throughout the same:

Figure 1A:
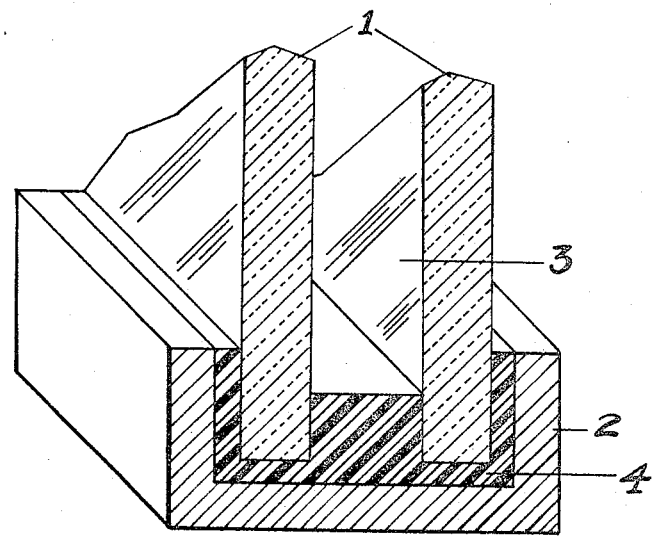
FIGS. 1a, 1b and 1c are fragmentary cross-sectional views of improved double glazed sealed glass structures showing different enclosing glass and spacer elements and sealing means arrangements.
Figure 1B:
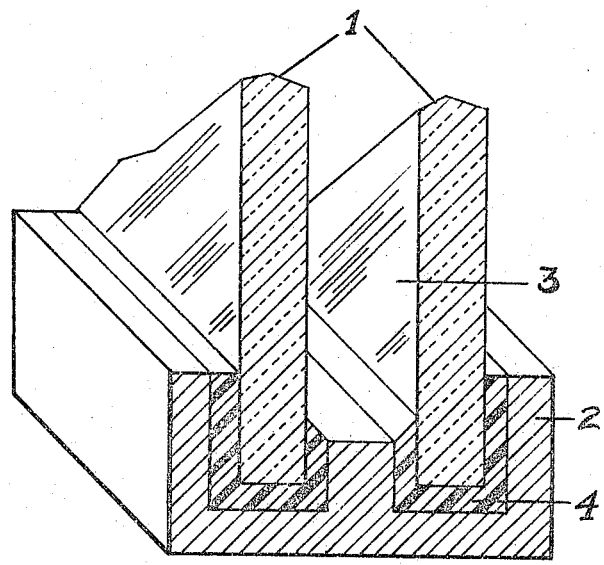
Figure 1C:
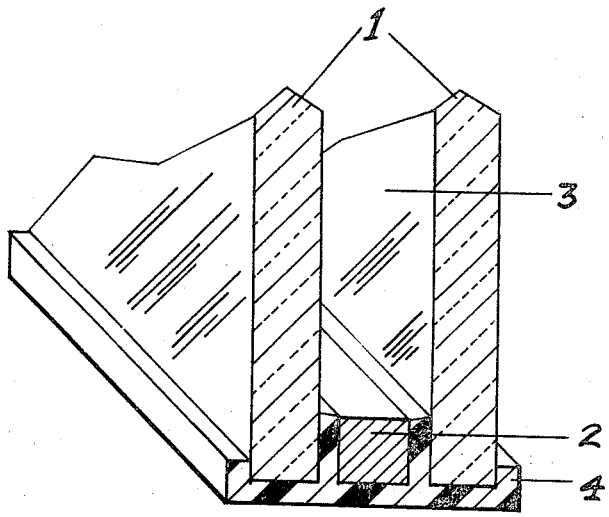
Figure 2:
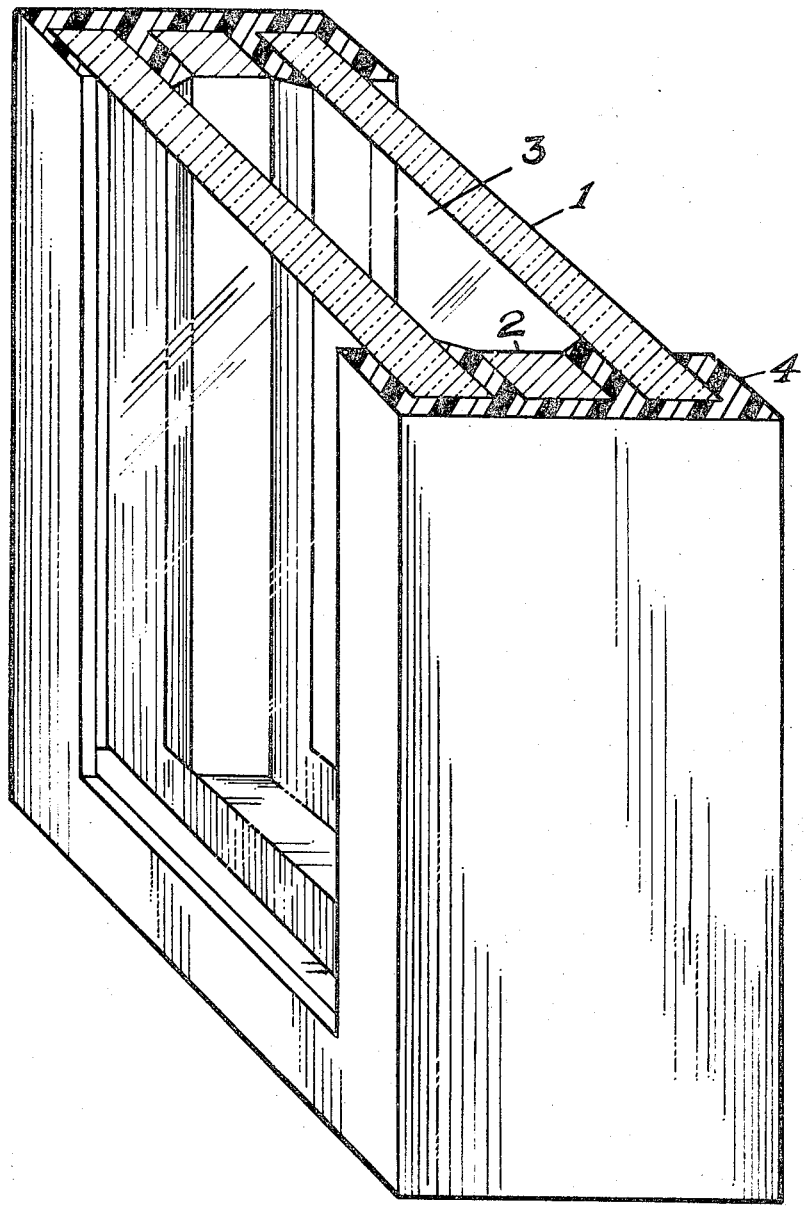
FIG. 2 is a fragmentary longitudinal view of an improved double glazed sealed insulated glass structure having the glass and spacer enclosing elements and sealing means arrangement as shown in FIG. 1c.

FIGS. 1 and 2 represent preferred embodiments of this invention, improved sealed structures such as insulated glass windows which comprise substantially three structural elements: a plurality of structural translucent enclosing elements, such as glass, 1, a plurality of structural spacer enclosing elements 2 disposed in sealable relationship and spaced substantially adjacent to one another so as to form an enclosed void 3, each translucent element separated from its adjacent translucent element by the enclosed void 3; and a cured high sulfur rank polysulfide rubber sealing means 4 formed from a sealant comprising a high sulfur rank polysulfide polymer such as that prepared according to the methods disclosed by E. R. Bertozzi in the copending U.S. patent applications Ser. No. 302,724, filed on Aug. 16, 1963 entitled "High Rank Blocked Polysulfide Polymers, Process and Products," now abandoned, and Ser. No. 290,637, filed on June 26, 1963, and entitled "High Rank Polysulfide Polymers, Process and Products," now abandoned, which rubber seals the adjacent translucent and spacer enclosing elements one to another so as to form an enclosed and sealed void 3 therebetween.

Figure 3:
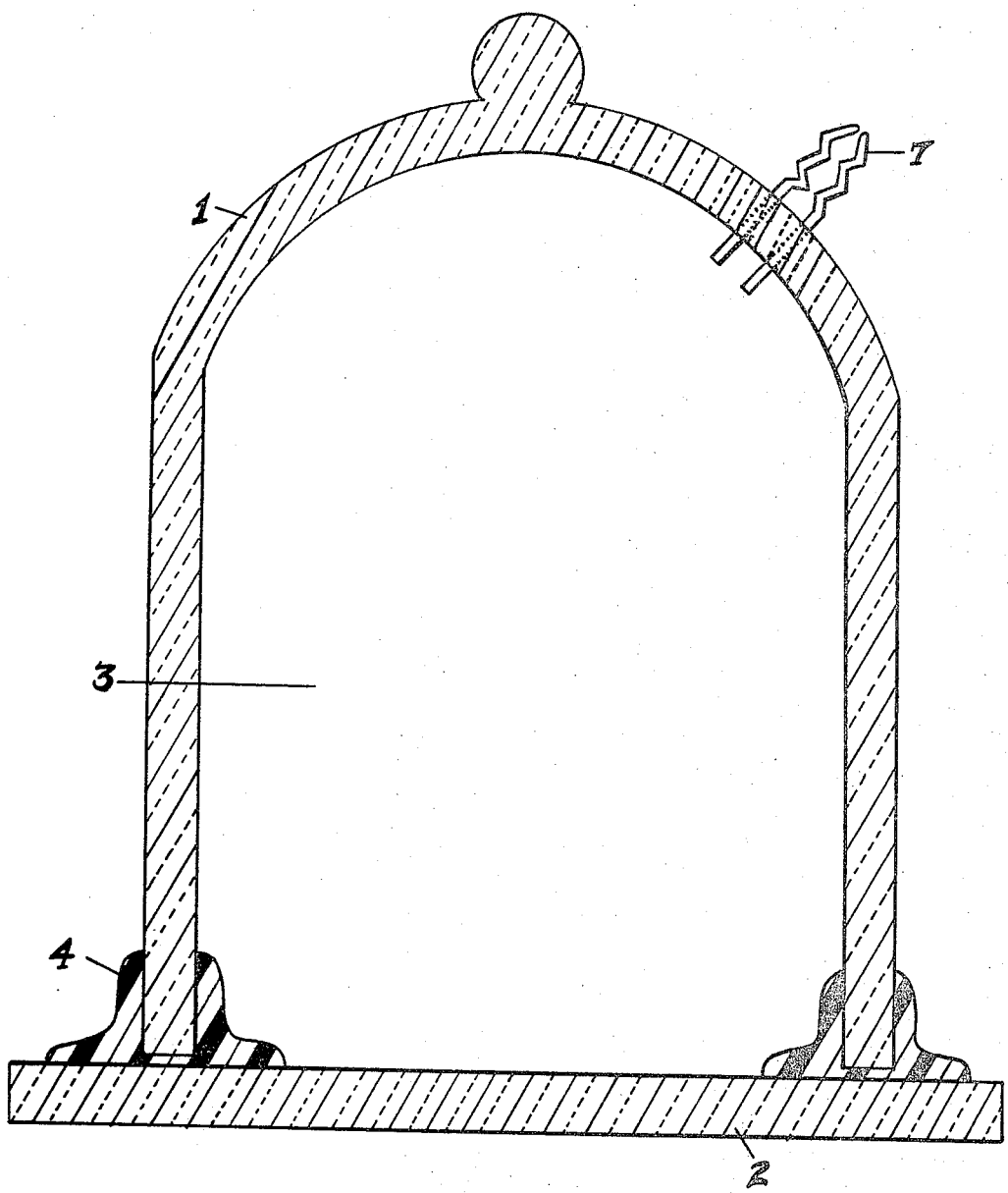
FIG. 3 is a cross-sectional view of a sealed bell jar the enclosing elements of which are sealed with a sealing means formed from high sulfur rank polysulfide sealant.

In FIG. 3 a bell enclosing element 1 of the bell jar is sealed to a base enclosing element 2 with a cured rubber sealing means 4 formed from a high sulfur rank polysulfide polymer, such as is prepared by the method disclosed by Bertozzi in the aforementioned patent applications, to form a sealed enclosed void 3 therebetween. FIG. 3 also shows, as an optional element, a closable port 7 that pierces the bell enclosing element of the sealed structure so as to permit possible evacuation therethrough to form a vacuum within void 3, or so as to permit the sparging of the void with some fluid, such as oxygen or nitrogen or another gas or some liquid thus to provide some particular and desired environment within the void of the sealed structure. It should be noted that the sealing means 4 may be in the form of a gasket adherently sealed to the base enclosing element 2, and channeled to removably receive the bell enclosing element, which bell when seated in the rubber channel and held by the compressive elastic grip thereof would enclose the void with a substantially vapor-impermeable seal thus to form a temporarily enclosed sealed structure of this invention; by "temporary" is meant that the bell element once sealed subsequently may be dislodged from the elastic grip of the channel of the sealing means, thus opening the structure, say to receive objects within the void, and then upon a reseating of the bell element in the gasket channel, would reseal and reconstitute the enclosed sealed structure.

Figure 4:
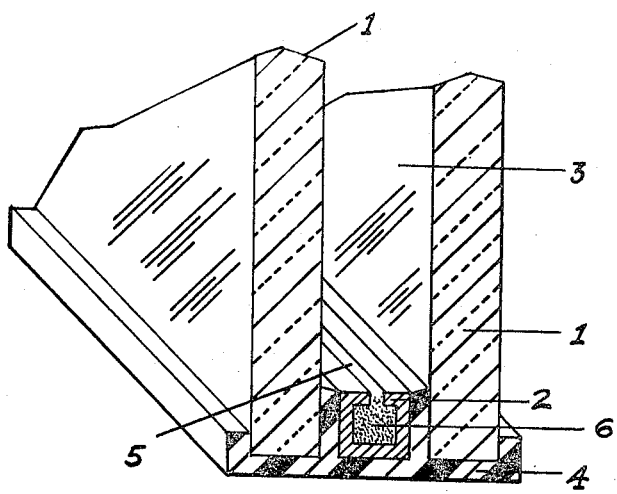
FIG. 4 is a fragmentary cross-sectional view of an improved double glazed sealed glass structure of this invention similar to that of FIG. 1c but further having a dessicant exposed to the void space and held within a channel-containing spacer enclosing element.

FIG. 4 represents yet another embodiment of the invention, similar to those illustrated in FIGS. 1 and 2, wherein a plurality of structural translucent enclosing elements 1 and structural enclosing spacer elements 2 are disposed in sealable relationship and spaced substantially adjacent to one another so as to form an enclosed void 3 therebetween, the spacer elements being formed with a channel 5 which can contain a dessicant 6 within the channel and open to the void, and a sealing means 4 which is a cured high sulfur rank polysulfide rubber formed from a curable sealant based upon a high sulfur rank liquid polysulfide rubber, which sealing means is in sealing relationship to the enclosing elements so as to seal said enclosing elements one to another thus to enclose said void and form a sealed enclosed structure.

The present process for forming a sealed insulated structure of this invention comprises the steps of (a) disposing a plurality of vapor impermeable enclosing elements in adjacent spaced relation to one another so as to form an enclosed void therebetween; (b) applying a curable high sulfur rank organic polysulfide liquid polymer based sealant composition between the adjoining peripheries of the adjacent vapor impermeable elements so as to join and seal them one to another and so as to form an enclosed and sealed void therebetween, the polysulfide sealant composition being formed with high sulfur rank organic polysulfide liquid polymers such as are disclosed in copending U.S. patent applications 302,724 and 290,637; (c) maintaining the sealant composition so applied at effective curing temperatures therefor for effective time intervals so as to form a rubber seal on the structure that is substantially resistant to permeation therethrough by water vapor.

Polysulfide liquid polymers of the type disclosed by Patrick et al. in their U.S. Patent 2,466,963 have been used for some while in sealant compositions to bond, upon cure, glass and other structural elements such as metals, ceramics, etc. to substrates with a rubbery seal. Indeed, they have been used to prepare sealed, insulated structures similar to the type herein disclosed. The use of an in situ moldable sealant of the type provided by the Patrick liquid polysulfide polymers provides for substantial ease and economies in the fabrication of sealed, insulated structures over other methods. Also structures so formed show substantial resistance to breakage due to wind pressures and temperature fluctuations over structures formed by other methods. The cured rubber seals provided by such Patrick polymers, however, permit the transmission of water vapor therethrough at rates which are not wholly satisfactory for long-termed resistance to fogging, or to maintaining a long-termed moisture free atmosphere within the void space. The novel sealed insulated structures of this invention, however, do provide for such satisfactory long-termed resistance, the seals of which have a vapor transmission rate that is about one-tenth of that of the prior art polysulfide rubber seals.

Conventional, liquid polysulfide polymers and their preparation are disclosed in the Patrick Patent U.S. 2,466,963. According to the process disclosed therein, the conventional liquid polymers, which have mercaptan, —SH, terminals, are formed by "splitting" solid, high molecular weight polysulfide polymers. The solid polymers are formed, generally, by reacting an inorganic polysulfide such as alkali metal or alkaline earth metal polysulfides with organic dihalides, i.e., $$nNa_2S_x + Cl—R—Cl \rightarrow 2nNaCl + HS(RS_x)_nSH$$

wherein R may represent an alkylene, thiahydrocarbon or oxahydrocarbon radical such as the ethyl formal or ethylene gem diether radical $$—CH_2—CH_2—O—CH_2—O—CH_2CH_2$$

$x$ is the sulfur rank of the inorganic polysulfide and also of the resulting solid polysulfide polymer and can be varied from an average value of about 1 to 5, and $n$ is the degree of polymerization and is about 2000 to 4000 for such solid polymers. Usually a small amount, about 0.1 to 2 mol percent, of a crosslinking agent having three or more reactive halide groups, such as trichloropropane, trichloroethane, bis(dichloropropyl)formal, polychlorinated paraffins and $\beta,\beta',\gamma,\gamma'$-tetrachloro normal propyl ether, is incorporated in the making of the solid polymer to obtain branching of the polymer chains. The crosslinking agent reacts with the inorganic alkali metal or alkaline earth metal polysulfide help to propagate linear polymer backbone formation through two of its halide groups in the manner of the organic dihalide discussed above. The remaining chlorine groups of the crosslinking agent pendant to the resulting linear polymer backbone then react with more inorganic polysulfide to propagate yet other polymer chains branching from the linear backbone.

To obtain the liquid Patrick-type low molecular weight mercaptan terminated polymers, the solid polymers produced as described above are "split" with a "splitting agent" such as sodium monohydrogen sulfide, NaSH. The splitting agent chemically is a reducing agent which cleaves the solid polymer at the sulfur-sulfur bond of its polysulfide groups in a random fashion to form liquid lower molecular weight —SH terminated polymers. This may readily be illustrated by considering a solid polymer having a sulfur rank of 2, i.e. having disulfide type polysulfide linkages:

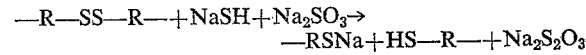

A neutralizing and coagulating agent such as acetic acid is then used in Patrick's process to coagulate the resulting liquid polymer droplet suspension to a continuous liquid phase and concomitantly convert the terminal —RSNa groups of the polymer molecules to terminal mercaptan, viz. —RSH, groups. The liquid polymer so formed is then washed, dried, filtered and packaged.

However, it has not been possible to date, as far as the applicants are aware, to form liquid polysulfide polymers in this manner which have a sulfur rank of higher than 2.0, i.e. greater than disulfide linkages wherein more than two sulfur atoms catenate. By having a sulfur rank of no higher than 2.0 it is meant, according to the present invention, that the sulfur linkages joining the recurring hydrocarbon, oxahydrocarbon or thiahydrocarbon radicals in the chain of the liquid polymer contain an average of 2.0 or less sulfur atoms per polysulfide linkage. In fact, none of the catenated polysulfide linkages in the conventional Patrick-type liquid polymers have ever been found to contain more than two sulfur atoms per joining linkage although some joining linkages will contain only one sulfur atom. It has been known that although the solid polysulfide organic polymer prior to splitting may have a nominal sulfur rank of more than 2.0, those sulfur atoms in excess of 2.0 per joining linkage, or "isosulfur" atoms, as they are referred to in U.S. 2,466,963, are partially or completely removed or stripped from the solid polymers, as disclosed in U.S. 2,278,128, before the solid polymers are split to liquid polymers, as disclosed in U.S. 2,466,963. The remaining isosulfur, if any, is removed during the splitting operation of U.S. 2,466,963, to leave no more than 2 sulfur atoms per joining linkage. These Patrick-type liquid polysulfide polymers have molecular weights in the range of about 500 to 12,000 and are liquid, i.e., pourable, at room temperature (about 25° C.). The Patrick-type polymers have the structure HS(R—S_x)_nR—SH wherein the average number of all the $x$'s, that is to say, of the number of sulfur atoms per average polysulfide joining linkage may be 1.5 to 2.0, $n$ is the number of repeating intervening units and may be about 2 to 70 and R is a plural-valent organic intervening unit that is an organic aliphatic radical such as an alkylene, thiahydrocarbon or oxahydrocarbon radical, e.g.,

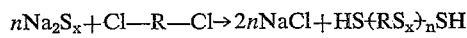

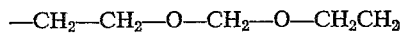

Copending application S.N. 290,637, entitled "High Rank Polysulfide Polymers, Process and Products" and filed June 26, 1963 in the name of Eugene R. Bertozzi, discloses formation of the "high sulfur rank" polysulfide liquid polymers, that is to say, an organic polysulfide liquid polymer which has an average sulfur rank greater than 2.0, i.e. more than 2 catenated sulfur atoms per polysulfide joining linkage, and which also has —SSH terminals. These polymers cure at room temperature without the use of a separate cure catalyst such as is required by Patrick's polymers, and cure merely upon exposure to the open atmosphere. They are found upon cure to provide rubbers which are more resistant to solvents such as toluene than the cured rubbers of conventional Patrick-type polysulfide low sulfur rank liquid polymers. These Bertozzi polymers may be used to provide sealants to practice the instant invention. The Bertozzi high sulfur rank polysulfide polymers have a disadvantage, however, in that during cure they emit hydrogen sulfide fumes. For some applications, such as where sealant is cured in closed rooms, the fumes emitted may possibly be a disadvantage. According to Bertozzi, when the Patrick-like liquid polysulfide polymers are reacted with elemental sulfur, high sulfur rank —SSH terminated polymers are formed. The reaction proceeds as follows:

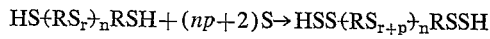

wherein the average of all the $r$'s is 1.5 to 2.0, $p$ is 0.1 to 3.0, $n$ is 2 to 70 and $r+p$ is the desired sulfur rank of the high rank polymer product; $r+p$ for any one joining linkage may be 1 to 5 sulfur atoms, at least one $r+p$ linkage has more than 2 sulfur atoms, and the average of all the linkages is a $r+p$ sulfur rank of about 1.6 to 5.0, and preferably is an average $r+p$ sulfur rank of about 2.5 to 4.0. The high sulfur rank polymer forming reaction can be carried out at moderate temperatures of about 20 to 50° C. in an open vessel, but is preferably carried out under an inert gas such as nitrogen. To obtain the Bertozzi polymers which have an average $r+p$ rank in excess of about 3.0, however, it is preferable to conduct the reaction in the presence of about 0.5 to 10% by weight of an amine catalyst such as triethylamine, dibutyl amine or n-butyl amine. Triethylamine is the preferred catalyst since it tends to promote the fastest reaction times. The reactions are accomplished in about 2 to 12 hours. A small amount of water is also used with the amine to facilitate catalyst action. It is believed that water promotes increased solubility and dispersion of the amine in the reaction system. Solvents such as dimethylformamide may be used in more viscous reaction systems. The resulting high sulfur rank —SSH terminated liquid organic polysulfide polymer is unusual in that it cures on exposure to the atmosphere with the emission of $H_2S$, and does not need a separate curing agent.

It had further been found according to Bertozzi in yet another copending application, S.N. 302,724, that the emission of noxious hydrogen sulfide fumes during the cure of high sulfur rank —SSH terminated polysulfide polymers can be avoided by blocking the —SSH terminals with an aldehyde or ketone prior to the cure of the polymers. The use of sealants employing the blocked high rank polymers, for some embodiments of this invention, may be preferred. According to application S.N. 302,724, the blocking of the —SSH terminals is accomplished by reacting the previously described liquid high sulfur rank —SSH terminated polysulfide polymers with an aldehyde or ketone, most preferably in the presence of an amine. It is believed that the aldehyde or ketone reacts with the —SSH terminal to form hemiacetal or hemi-ketal terminals as exemplarily indicated by reaction with an aldehyde:

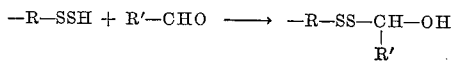

Blocking the —SSH terminal groups can be done either before, after, or during formation of the liquid, high sulfur rank polysulfide polymers from the conventional, liquid polysulfide polymers. The high sulfur rank polymers thus can be blocked after they are formed by reacting the blocking agent therewith in the presence of an amine; or they can be blocked concurrently with their formation by adding the blocking agent to a sulfur/amine/conventional liquid polysulfide polymer reaction system. The blocked high sulfur rank polymers can also be formed by first blocking a conventional, liquid polysulfide polymer with the aldehyde or ketone blocking agent in the presence of an amine, and subsequently reacting the blocked conventional liquid polymer with sulfur. Slightly more of the amine is usually needed where sulfur is subsequently added to a carbonyl blocked conventional liquid polymer. Desirably, when sulfur is added to the blocked conventional liquid polymer, little or no $H_2S$ evolves. When sulfur is added to the unblocked polymer, or when sulfur, the conventional low sulfur rank liquid polysulfide polymer, and blocking agent are reacted concurrently, noticeable amounts of $H_2S$ evolve. The reactions are preferably carried out under an inert atmosphere, such as under a blanket of nitrogen.

Typical aldehydes which are used in the blocking reactions include formaldehyde, furfural, and acetaldehyde in about 2 to 10% by weight quantities of the weight of liquid high rank polymer. Formaldehyde is the preferred aldehyde. Typical of the ketones which may be used in this blocking reaction is acetone which should be used in approximately 10% by weight quantities of liquid high rank polymer.

Amine catalysts which are utilized to promote the blocking process include triethylamine, dibutyl amine and n-butyl amine. The preferred catalyst is triethylamine which should be present in about 0.5 to 10% by weight and preferably about 0.5% by weight quantities of the liquid high rank polysulfide polymer.

The blocked high rank polysulfide polymers can be cured with conventional low sulfur rank polysulfide curing agents such as organic and metallic peroxides. Exemplary cure systems would consist in the use of lead peroxide or lead oxide.

The high sulfur rank liquid polysulfide polymers described above are formulated to form suitable sealant compositions for present use by compounding the uncured high sulfur rank polysulfide liquid polymer with reinforcing fillers, such as carbon black or silicon dioxide, nonvolatile plasticizers, pigments for imparting color, cure accelerators for increasing the rate of cure or cure inhibitors such as stearic acid for slowing the cure rate, curing agents such as any of oxidizing agents such as the many metal oxides or organic peroxides disclosed by the art to act as curing agents for the low sulfur rank mercaptan terminated polysulfide liquid polymers of Patrick, and one or more chemical adhesion promoters, which permit an adhesive bond to be effected between the cured polysulfide rubber seal and the vapor impermeable enclosing elements such as glass plates, rubber, plastic, metal, impermeable stone or any other vapor impermeable structural enclosing material. The sealants may be compounded by uniform admixture of the constituent ingredients on a paint mill or in a vaned blender. The types and amounts of the constituent ingredients of the sealant, other than the high sulfur rank liquid polysulfide polymer, in general, are as would be used to prepare conventional sealants with the Patrick-taught low sulfur rank polysulfide liquid polymers. The sealants useful to practice this invention are moldable or fluid and may conveniently be gunned into place between the adjacent elements with a caulking gun, or alternately may be spatulated into place to form upon cure a sealed enclosed structure of this invention.

We have found that certain adhesion promoters seem especially effective for present use when glass is at least one of the enclosing elements. While with low rank polysulfide polymer sealants adhesion promoters of many sorts are effective for specific end uses, such as sundry primers and adhesion additives, for present use, however, only certain adhesion additives, which herein are designated as "adhesion means," seem to work well to provide that strong and adhesive bond of cured high rank polysulfide to substrate so as to substantially inhibit permeation by water vapor at the enclosing element-rubber seal interface and also to provide for the high adhesive peel strengths desired between the cured rubber seal and the abutted enclosing elements. Exemplary adhesion means are B-stage phenolic resins and silane materials, such as the types disclosed by Carpenter et al. in U.S. Patent 3,123,495, and especially glycidoxy and mercaptan functional silanes and siloxanes. Adhesion means, according to the present invention, is intimately admixed as a formulation component with the other sealant ingredients prior to application of the sealant between adjacent enclosing elements. Following application of the sealant the sealant is permitted to cure to form a rubber seal, the sealing means of the instant invention. In general, the effective curing temperatures for the high rank organic polysulfide liquid polymer based sealant compositions of from about 60° F., common room temperatures, to about 250° F. are employed for effective curing times of from about 0.5 hour to about 3 months dependent upon the specific curing temperatures employed and sealant compositions used.

The following examples are merely illustrative of the present invention, but are not intended as a limit upon the scope thereof.

EXAMPLE 1

A. *Preparation of Polymers I and II*

A 2.0 sulfur rank liquid polysulfide copolymer formed according to the Patrick et al. method of U.S. 2,466,963 from 65.5 mol. percent of dichloro-diethyl gem diether, 32.5 mol. percent of ethylene dichloride, and 2 mol. percent of trichloropropane with sodium polysulfide of sulfur rank 2.25, and called hereinafter Polymer I, was reacted with paraformaldehyde in the presence of triethylamine to block the —SH terminals, and then was further reacted with additional sulfur to form a 3.5 sulfur rank liquid polysulfide copolymer, hereinafter called Polymer II, substantially in accordance with the procedure given in Examples 16 and 17 of copending patent application S.N. 302,724.

B. *Moisture-vapor transmission (MVT)*

Polymers I and II, prepared as above, were compounded into separate fluid sealant compositions, hereinafter called Sealant I and Sealant II respectively, according to the recipe:

| Component: | Parts by weight |
|---|---|
| Polymer | 100.0 |
| SRF #3, carbon black | 30.0 |
| Aroclor 1254, a chlorinated biphenyl, liquid diluent plasticizer | 5.0 |
| Stearic acid | 1.0 |
| Durez 10694, a B-stage phenol, an adhesion means | 5.0 |
| Curing paste— | |
| Lead peroxide, $PbO_2$ | 7.5 |
| Aroclor 1254 | 7.5 | by paint milling the constituent components to form uniform admixtures; the curing paste was added last.

Sealants I and II were permitted to cure for about 3 days at about 70° F., and then were sheeted out on a rubber mill and press cured in a rubber press to form test sheets at about 25,000 p.s.i., and 250° F. for 6 minutes. The test sheets were then used according to ASTM E-96–53T procedure to determine moisture vapor transmission.

|  | MVT |
|---|---|
| Sealant I | $0.694 \times 10^{-2}$ fl. oz./day/ft.$^2$ |
| Sealant II | $0.218 \times 10^{-2}$ fl. oz./day/ft.$^2$ |

EXAMPLE 2

A. *Preparation of Polymer III*

A 3.5 sulfur rank polysulfide liquid polymer, hereinafter called Polymer III, was prepared according to the procedure of Example 1 using 4,000 grams of a 2.0 sulfur rank polysulfide liquid polymer substantially of the structure:

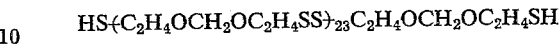

70 grams of paraformaldehyde in the presence of 10 cc. of tetraethylamine, and 1,158 grams of sulfur.

B. *Moisture-vapor transmission (MVT)*

In similar manner to that used in Example 1 for Polymers I and II, Polymer III and a 2.0 sulfur rank polysulfide liquid polymer substantially of the structure:

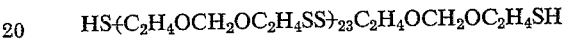

were compounded into separate fluid sealant compositions, called hereinafter Sealants III and IV respectively according to the recipe of Example 1, then cured and tested for moisture-vapor transmission as related therein:

|  | MVT |
|---|---|
| Sealant III | $0.25 \times 10^{-2}$ fl. oz./day/ft.$^2$ |
| Sealant IV | $1.5 \times 10^{-2}$ fl. oz./day/ft.$^2$ |

EXAMPLE 3

A. *Sealant V*

Sealant V was prepared substantially according to the recipe and method used for Sealant III, except that 3 parts by weight of another adhesion means, the adhesion additive Z–6040 marketed by Dow-Corning, a gamma-glycidoxypropyl trimethoxysilane, was substituted for the 5 parts of phenolic adhesion additive Durez 10694 used in Examples 1 and 2.

B. *Preparation of test sealed enclosed structures IV and V*

Double glazed sealed insulation glass structures 6″ x 6″ were prepared for dew point tests using Sealants V and IV, which are hereinafter called Structures V and IV respectively. In preparing each of the test structures, rod-like metal spacer elements having a central channel which contained the desiccant silica gel were joined to form a rectangle approximately 5⅞″ x 5⅞″. The sealant was gunned as a bead from a caulking gun along the 5⅞″ x 5⅞″ open face perimeter of the rectangle, and a glass plate enclosing element, 6″ x 6″, was laid thereon to form a sealed joint between the spacer rectangle and glass. This was repeated with the other open face of the spacer rectangle to form a sealed insulated double glazed glass structure similar to that shown in FIGURE 4. The periphery or perimeter of the glass plate elements and spacer rectangle was further gunned with sealant to fill any unsealed exterior clefts therebetween. Spacers, 6″ x 6″, and such as are shown in FIG. 1a, were positioned around the structure to "frame" it, and were sealed thereto with sealant. The test structures so formed were kept at about 70 to 80° F. for about 7 days to permit complete cure of the sealants to rubber seals. The sealed structures were tested for leaks in a vacuum chamber and were found to be hermetically sealed.

C. *Dew point determinations*

The test method used to determine dew points of the test structures was substantially as given by Wilson et al. in their article "Performance of Sealed Double-Glazing Units," J. Canadian Ceramic Society, vol. 31, pages 68–82 (1962). Each 24 hours, except on weekends, the test structures were cycled for 17 hours at 135° F. and 100% RH, for 3 hours at 35° F., and for 4 hours at room temperature during which latter period the dew point temperatures were taken.

| Dew Point, in °F. | | Total Hours at 135° F. and 100% RH |
|---|---|---|
| Structure IV | Structure V | |
| −45 | <−105 | ² Zero |
| −40 | (¹) | 34 |
| (¹) | −102 | 105 |
| (¹) | −70 | 141 |
| −30 | (¹) | 154 |
| −15 | (¹) | 222 |
| (¹) | −45 | 236 |
| (¹) | −40 | 270 |
| −14 | (¹) | 273 |
| (¹) | −35 | 287 |
| −8 | (¹) | 290 |
| (¹) | −8 | 673 |

¹ The test measurements for the two structures were run at different times; no dew point was taken at this time for this structure.
² The zero time dew point temperatures were taken after a 7 day room temperature cure of sealant was permitted to occur. Thus premeation of sealant by water vapor during this period could occur, and account for the different zero time dew point values.

Thus it may be seen from the examples that high sulfur rank polysulfide liquid polymers in sealants for present use provide upon cure substantially higher resistance to water-vapor transmission through cured seals formed therewith, than do cured seals formed from 2.0 sulfur rank polysulfide liquid polymers. Also it may be seen that the present improved sealed structures employing seals formed with high sulfur rank polysulfide liquid polymers provide substantially reduced dew point temperatures, both initially just after room temperature cure, and after substantial temperature cycling intervals at higher temperatures and relative humidities, to provide dew point temperatures substantially below those attained by prior art sealed structures employing seals formed with low sulfur rank liquid polysulfide polymers. Although why these phenomena occur are not fully understood, it is believed that the additional catenated sulfur in the high sulfur rank polysulfide polymer backbones provides at least some linkages with greater than 2 sulfur atoms per polysulfide linkage. The cured seal formed therewith provides the observed added resistance to permeation by water vapor, and thus provides improved sealed vapor impermeable enclosed structures with substantially reduced dew point temperatures and substantially enhanced resistance to fogging.

We claim:
1. In a sealed structure having a plurality of spaced and aligned structural elements sealed therebetween by means of an intervening sealant strip.
the improvement comprising a sealant strip formed from a sealant based on a curable, liquid, high sulfur rank polysulfide polymer having —SSH terminals and an average sulfur rank of about 1.6 to 5,
said sealant providing said structure with improved and substantial resistance to water vapor permeation.

2. A sealed structure as in claim 1 in which said polysulfide polymer has an average sulfur rank of about 2.5 to 4.0.

3. A sealed structure as in claim 1 having chemical adhesion means for promoting the adhesion of said sealant strip to said structural elements.

4. In an enclosed sealed structure having a plurality of spaced and aligned enclosing structural elements sealed therebetween by means of an intervening sealant strip
the improvement comprising a sealant strip formed from a sealant based on a curable, liquid, high sulfur rank polysulfide polymer having —SSH terminals and an average sulfur rank of about 1.6 to 5,
said sealant providing said structure with improved and substantial resistance to water vapor permeation.

5. An enclosed sealed structure as in claim 4 in which said polysulfide polymer has an average sulfur rank of about 2.5 to 4.0.

6. An enclosed sealed structure as in claim 4 having chemical adhesion means for promoting the adhesion of said sealant strip to said structural elements.

7. In an enclosed, insulated, sealed structure having a plurality of spaced and aligned enclosing and insulating structural elements sealed therebetween by means of an intervening strip
the improvement comprising a sealant strip formed from a sealant based on a curable, liquid, high sulfur rank polysulfide polymer having —SSH terminals and an average sulfur rank of about 1.6 to 5,
said sealant providing said structure with improved and substantial resistance to water vapor permeation.

8. An enclosed, insulated, sealed structure as in claim 7 in which said polysulfide polymer has an average sulfur rank of about 2.5 to 4.0.

9. An enclosed, insulated, sealed structure as in claim 7 having chemical adhesion means for promoting the adhesion of said sealant strip tf said structural elements.

10. In a process for forming a sealed structure having a plurality of spaced and aligned structural elements sealed therebetween which comprises
(a) spacing and aligning at least one pair of said structural elements in sealable relation,
(b) applying a strip of curable polymer based sealing means in sealing relation between said pair of structural elements,
(c) and causing said curable polymer of said sealing means to cure to a rubber and seal said structural elements in place,
the improvement which comprises using as said sealing means a sealant based on a curable, liquid, high sulfur rank polysulfide polymer having —SSH terminals and an average sulfur rank of about 1.6 to 5 to
thereby provide said sealed structure with improved and substantial resistance to water vapor permeation.

11. A process as in claim 10 in which said curable, liquid high sulfur rank polysulfide polymer has an average sulfur rank of about 2.5 to 4.0.

12. A process as in claim 10 in which said curable, liquid, high sulfur rank polysulfide polymer has blocked terminals and said blocked terminals are unblocked prior to the cure of said polymer.

13. A process as in claim 12 in which said blocked terminals are blocked with a carbonyl compound.

14. A process as in claim 13 in which said carbonyl compound is an aldehyde.

15. A process as in claim 14 in which said aldehyde is formaldehyde.

16. A process as in claim 10 in which said sealed structure is an enclosed structure.

17. A process as in claim 10 in which said sealed structure is an insulated structure.

References Cited

UNITED STATES PATENTS

| 2,466,963 | 4/1949 | Patrick | 260—79.1 |
| 2,527,377 | 10/1950 | Patrick | 260—79.1 X |
| 3,169,119 | 2/1965 | Dankert et al. | 260—79.1 |
| 3,212,179 | 10/1965 | Koblensky | 52—403 |
| 3,219,638 | 11/1965 | Warner | 260—79.1 |

FOREIGN PATENTS

| 900,766 | 7/1962 | Great Britain. |

KENNETH DOWNEY, *Primary Examiner.*